May 17, 1932.　　G. C. S. VON HILVETY　　1,858,647

SYSTEM FOR TRANSMITTING MOTION TO THE DRIVING WHEELS OF MOTOR CARS

Filed Nov. 24, 1930　　2 Sheets-Sheet 1

G. C. S. von Hilvety
INVENTOR

BY
ATTYS.

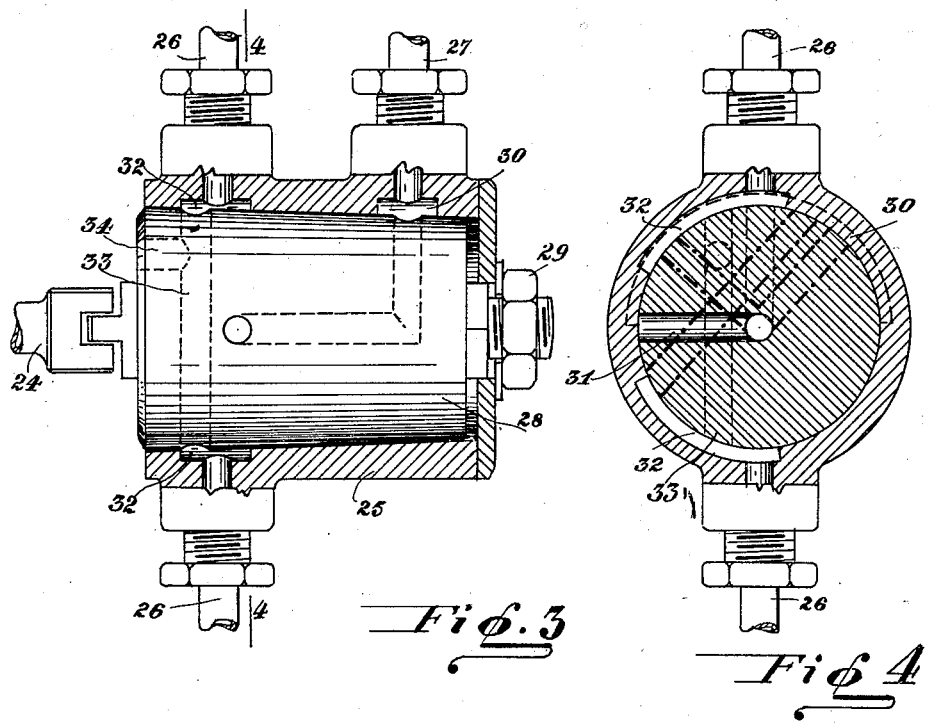
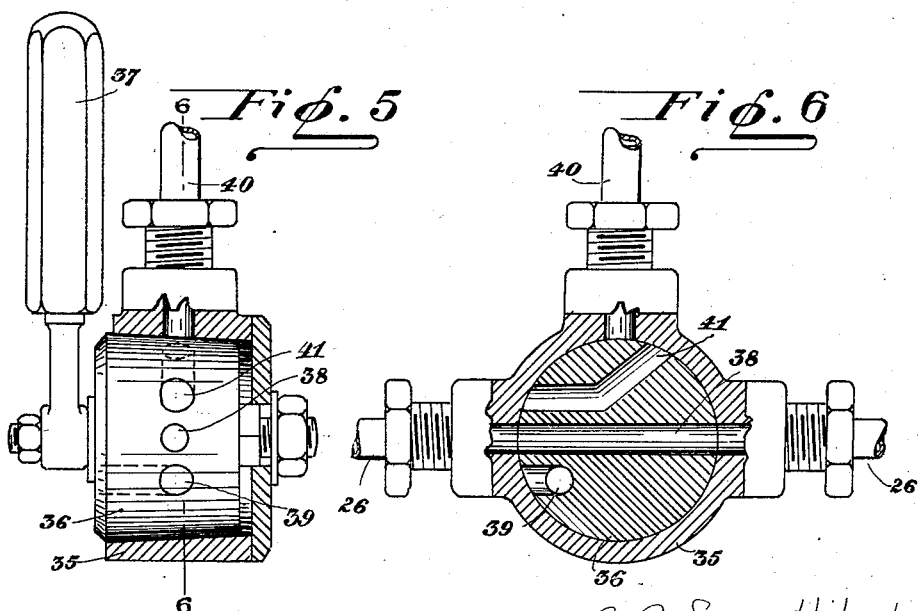

Patented May 17, 1932

1,858,647

UNITED STATES PATENT OFFICE

GEORGE CAROL SCHÜLE VON HILVETY, OF BUENOS AIRES, ARGENTINA

SYSTEM FOR TRANSMITTING MOTION TO THE DRIVING WHEELS OF MOTOR CARS

Application filed November 24, 1930. Serial No. 497,892.

This invention relates to an improved system for transmitting motion to the driving wheels of motor cars and has for its object an arrangement which avoids the use of differentials and permits obtaining a normal transmission to the driving wheels under any condition of running.

Another object of the invention is the use of compressed air for performing the several actions of the system.

The invention essentially consists in coupling or uncoupling each driving wheel to the driving axle by means of a clutch mounted on each wheel axle and adapted to engage with, or disengage from the bevel crown driven by the bevel pinion mounted on the drive shaft. Said two clutches are operated from the steering mechanism, so that when the vehicle advances in an approximately straight direction, both wheels will be driving wheels and will rotate at the same speed while, when the vehicle is taking a curve, one of the wheels will be disengaged.

A neutralizing device is provided which allows of rendering the clutches independent from the direction, in order to be able to engage or disengage at will any one of the wheels, which arrangement will be found useful in certain cases.

The control of the clutches may be performed in several ways, either by mechanical or electrical means, as from the steering device, although according to a preferred embodiment, compressed air, obtained from a suitable source mounted on the car, is conveniently used for that purpose.

In this latter case, a set of valves is employed, controlled by the steering device and adapted to feed the compressed air to cylinders, the pistons of which operate the clutches.

In order that the invention may be readily understood and carried into practice, the same has been shown, by way of example, in the accompanying illustrative drawings, in which:—

Figure 3 shows a longitudinal section of the main cock, on the line 3—3 of Figure 2.

Figure 4 is a cross section on the line 4—4 of Figure 3.

Figure 5 shows a longitudinal section of the neutralizing cock, taken on the line 5—5 of Figure 2.

Figure 6 shows a section on the line 6—6 of Figure 5.

In all the said views, similar numbers of reference have been used to indicate like or corresponding parts.

Figure 1:
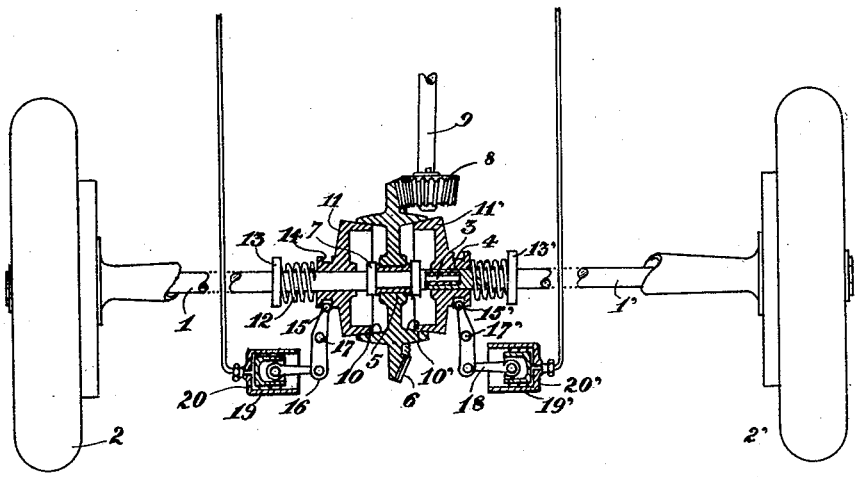
Figure 1 shows a diagrammatical view of the rear axle of an automobile, constructed in accordance with this invention.
Figure 2:
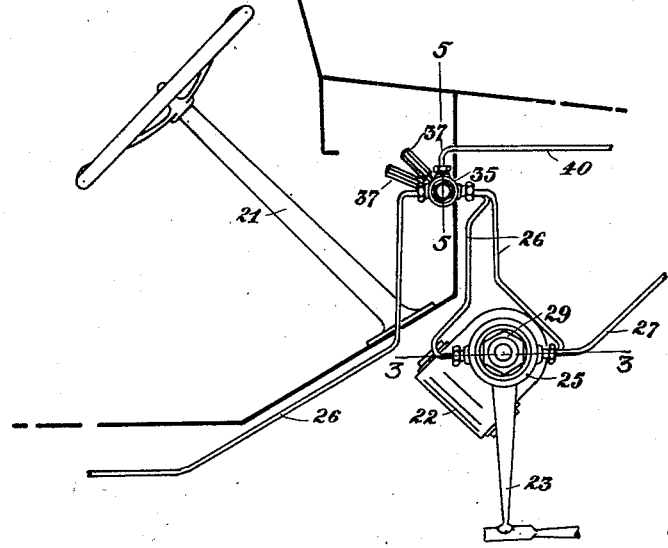
Figure 2 illustrates a general diagrammatic elevation of the set of valves or cocks operated by the steering mechanism and the driver.

Referring to Figure 1, the reference numbers 1 and 1' indicate the two halves of the rear axle, which carry the driving wheels 2 and 2'. The axle 1 is centered on the end of the axle 1' by means of a stud 3 which rotates in an anti-friction sleeve 4, lining the central bore of the corresponding axle 1'. On the end of the axle 1 is journalled, with interposition of an anti-friction sleeve 5, the bevel gear 6, prevented from shifting in a longitudinal direction on said axle by means of shoulders 7, fixed on the axle 1. In engagement with said bevel gear is the bevel pinion 8, secured by means of a pin to the end of the driving axle 9. In this diagrammatical view, the bearings of the axle have not been shown, as they may be of any suitable or desired construction.

On either face of the wheel 6 is formed a conical recess 10, for the reception of clutch dogs 11, 11', respectively. One of said dogs is mounted on each axle 1, 1', free for longitudinally sliding thereon, while obliging the axle to partake in its rotation. Suitable springs 12, compressed between the dog and a collar 13, secured to the axle, normally tend to hold said clutch dogs in engagement with the wheel 6. Each clutch dog is provided on its hub with a circular groove 14, into which enters the fork 15 of a lever 16, pivoted on a fixed stud 17, the other arm of said lever being jointed at its end to a connecting rod 18, jointed in turn to a piston 19, mounted to slide in the cylinder 20. Two of such cylinders are symmetrically arranged on a suitable part of the axle bearings, one cylinder being provided for each clutch. Said cylinders are conveniently connected to the controlling cocks or valves by means of a conduit 26, adapted for supplying compressed air to said cylinder or for connecting the same for exhaust to the outer air.

When the cylinders are in communication with the outer air, the springs 12 will cause the clutch dogs 11 to engage with the wheel 6, so as to render the two driving wheels integral one with the other and causing the same to rotate with the same speed. On supplying compressed air to one of said cylinders, the corresponding piston will overcome the resistance of the spring 12 and thereby disengage the respective axle, causing the driving wheel of that side of the car to rotate freely, while the wheel of the opposite side will remain engaged.

In Figures 2 to 6, the operating mechanism of the clutches has been shown, which, as before stated, forms an integral part with the steering device. 21 indicates the steering column, in which rotates the steering rod which operates, by means of a worm and a toothed sector mounted in a casing 22, the arm 23, by which the displacements of the steering rod are finally transmitted to the front wheels. In the present construction, the movements of the axle 24 of said arm are used for operating the main cock by means of which the cylinders 20 are placed in communication with the source of compressed air or with the outer air, as the case may be. Said cock comprises a fixed casing 25, connected to both conduits 26 leading to the cylinders, and to the tube 27, leading to the compressed air supply (not shown), and a conical rotatory part 28, formed integral with the axle 24. The cone 28 rotates within the casing 25, being confined to this latter by means of a washer and a screw nut 29. The tube 27 opens into an inner annular groove 30 formed in the casing 25, extending approximately over one half of the circumference thereof. The cone 28 is formed with an internal passage 31, opening by one of its ends opposite to said groove, and by its other end into one or the other of the chambers 32 or at a point intermediate between the same, according to the angular position imparted by the steering to said cone. In Figures 3 and 4, the full lines indicate the medium position of the cone, in which the passage 31 is situated between the two chambers 32. Said chambers 32 are formed in the casing 25, each of them comprising a sector, situated symmetrically at each side of the medium position of the passage 1. The distance separating both sectors corresponds with a small displacement of the driving wheels which it is necessary to provide for, without causing the operation of the device, and each of said sectors has an angular range corresponding with the maximum displacement of said wheels.

Opposite each chamber 32 opens an internal passage 33 of the cone, which communicates with the outer air by means of an orifice 34 provided at the end of the cone. The position of this latter passage is such that each chamber 32, when not in communication with the passage 31, will communicate with the outer air. Therefore, when in their medium position, both chambers will communicate with the outer air, and when the one is placed opposite to the passage 31, the other will communicate with the outer air.

The ducts 26, leading from the cylinders, pass first by the neutralizing cocks which each consist of a casing 35, within which rotates a cone 36 operated by a hand lever 37 placed within reach of the driver. The duct 26 enters and issues from the casing 35 at diametrically opposite points and when in a certain position, the cone 36 establishes the communication by means of the passage 38. In another position of the cone 36, the entrance of the duct 26, in direction toward the main cock, will be obturated, while the part of the duct 26 leading to the cylinder, will come opposite to a passage 39 of said cone, so as to connect the same with the outer air.

The casing 35 is also connected, at a point situated at right angles with regard to the duct 26, with a conduit 40, leading directly to the source of compressed air. Said conduit may be arranged to communicate with the duct 26, leading to the cylinder, by means of a passage 41, formed in the cone 36. From the foregoing it will be seen that this cock is adapted for operation in three positions.

The operation of the device in accordance with this invention, is as follows:

When the car is running in an approximately straight direction, that is, as long as the displacement caused by the steering device does not deviate the passage 31 of the main cock from the sector which separates the two chambers 32, no compressed air will be supplied to said chambers and in consequence the pistons 19 will not withdraw from the end wall or bottom of the cylinders 20 and both driving wheels will therefore remain engaged.

When a curve is to be taken, or as soon as the passage 31 will come opposite to one of the chambers 32, the compressed air supplied by the duct 27, will enter into the conduit 26 and thence pass to the corresponding cylinder. The piston 19 of said cylinder, on being operated, will disengage the dog 11 from the bevel gear 6, against the action of the spring 12, thereby allowing of the free rotation of the wheel 2 on the corresponding side of the car. The main cock, when occupying this position, will cause the other chamber 32 to place the other cylinder 20 in communication with the outer air, so that the other wheel 2 will remain engaged and act as a driving wheel. When taking a curve, therefore, only one of the wheels will act as a driving wheel and as the outer wheel may be chosen for that purpose, which, owing to centrifugal force, will exert a heavier pressure on the ground, any risk of lateral skidding will be avoided.

These two operations will normally take place when the neutralizing cocks are in their normal positions, with the connection established by the conduits 26. When it should be necessary to keep both wheels engaged while taking a curve, as might arrive to be the case when trying to get out of a bog, the position of said cocks would have to be changed by means of the hand lever 37, so as to cause both cylinders 20 to communicate with the outer air by means of the passage 39.

It might also be desired to disengage one of the wheels independently of the position of the steering mechanism, in which case the handle of the corresponding neutralizing cock must be operated so as to connect the conduit 40 with the duct 26, leading to the cylinder through the passage 41. This latter cylinder will then be supplied directly with compressed air and will maintain the corresponding wheel in a disengaged position, independently of the operations of the steering mechanism.

It will be evident that sundry modifications of construction and detail may be introduced without departing from the scope of this invention, which will be particularly set forth in the final claim hereto annexed.

Having now particularly described and ascertained the nature of my said invention and in what manner the same is to be performed, I declare that what I claim and desire to secure by Letters Patent, is:—

Improved system for transmitting motion to the driving wheels of motor cars, substantially comprising a clutch for each driving wheel, which allows of engaging or disengaging said wheel or its axle from the drive shaft, and means for operating said clutches, operated from the steering mechanism, the means for operating the clutches comprising, in connection with each clutch, a cylinder with a piston for operating said clutch, a cock arranged to cooperate with the displacements imparted to the steering mechanism and adapted, when in its medium position corresponding with an advance on a straight line, for connecting said cylinders with the outer air, so that the pistons will not operate the clutches and these latter will remain engaged, and when in a deviated position corresponding with the taking of a curve, for connecting one of said cylinders with a compressed air supply and the other with the outer air, or vice-versa, whereby the piston acted upon by the air, will operate its clutch and cause the free rotation of the respective driving wheel, while the other wheel will remain engaged, and a neutralizing cock for each cylinder, operated by hand or otherwise, for interrupting at will the connection between the cylinder and the first mentioned cock and establish the communication with the outer air, so that the respective driving wheel will remain engaged, independently of the movements of the steering mechanism, or establish a direct connection with the compressed air supply, so that said wheel will remain engaged independently of the movements of the steering mechanism.

In testimony whereof I affix my signature.

GEORGE CAROL SCHÜLE von HILVETY.